July 3, 1956 — R. A. PLUMMER — 2,753,085
MANURE DISTRIBUTOR
Filed May 11, 1953
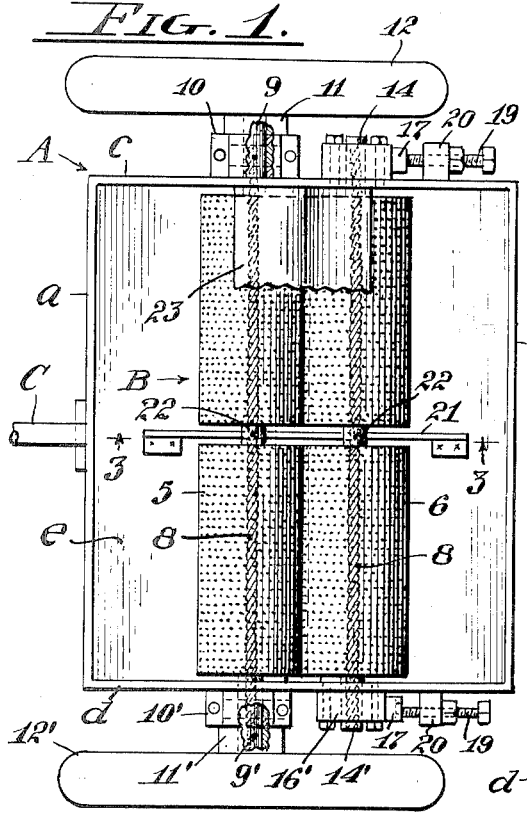
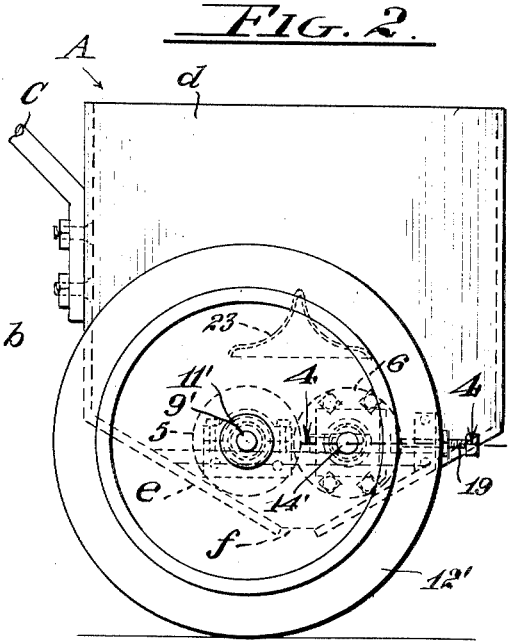
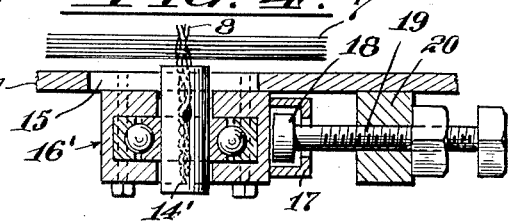
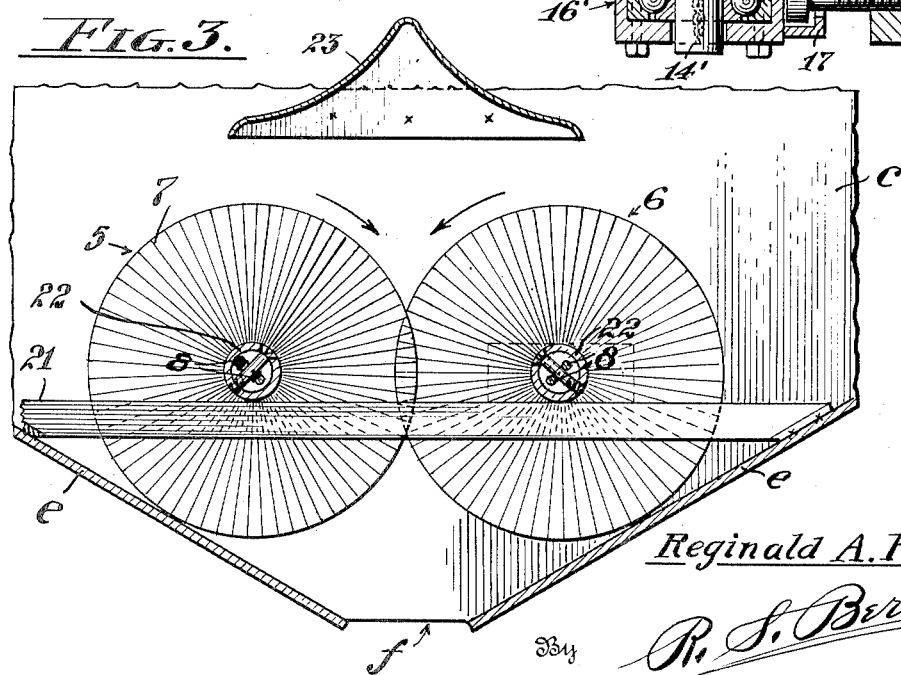
Inventor
Reginald A. Plummer;
By R. S. Berry
Attorney

United States Patent Office 2,753,085
Patented July 3, 1956

2,753,085

MANURE DISTRIBUTOR

Reginald A. Plummer, Baldwin Park, Calif.

Application May 11, 1953, Serial No. 354,200

3 Claims. (Cl. 222—177)

This invention relates to a manure distributor and has as its primary object the provision of a distributor which is capable of breaking up, finely disintegrating and spreading manure of the commercial type commonly employed in fertilizing lawns, grass plots and the like, which manure is ordinarily packed in paper bags as well as delivered in bulk and is characterized by being in a dry lumpy state capable of being crumbled into small particles.

A particular object of the invention is to provide a manure spreader which is simple and economical in construction, whereby it may be readily manufactured and marketed at such small cost as to render it within the purchasing power of the average home owner having a lawn requiring manuring from time to time.

Another object is to provide a construction in a spreader whereby a uniform distribution of the manure may be effected with little effort.

A further object is to provide a spreader with a pair of parallel feed rollers formed of cylindrical brushes arranged with flexible bristles of one brush intermeshed with the bristles of the other brush whereby the rotation of one of the brushes will effect rotation of the other brush and whereby dry lumpy and fragile materials acted on by the bristles of the feed rollers will be disintegrated, delivered to discharge in fine particles and evenly spread in a uniform ribbon like layer on a surface being traversed by the spreader.

Another object is to provide an adjustable mounting for at least one of the feed rollers whereby it may be adjusted laterally relative to the adjacent roller so as to vary or regulate the extent of overlap of the bristles of the rollers and also to compensate for wear of the bristles tips.

With the foregoing objects in view together with such other objects and advantages as may subsequently appear, the invention resides in the parts and in the combination, construction and arrangement of parts hereinafter described and claimed, and illustrated by way of example in the accompanying drawing, in which:

Fig. 1 is a plan view of the manure distributor with portions broken away:

Fig. 2 is a view in end elevation:

Fig. 3 is an enlarged detail in section and elevation taken on the line 3—3 of Fig. 1:

Fig. 4 is a detail in horizontal section taken on the line 4—4 of Fig. 2:

Referring to the drawings more specifically A indicates generally the bed of the distributor which is in the form of an open top rectangular hopper embodying side walls *a—b* end walls *c—d* and downwardly converging bottom walls *e—e* terminating in a narrow discharge slot *f* which extends longitudinally of the bed A between the end walls *c—d* and intermediate the side walls *a—b*.

Arranged within the bed A and extending longitudinally thereof adjacent the bottom walls *e—e* is a pair of horizontal parallel laterally interengaged feed rollers B which in carrying out the invention comprise cylindrical brushes 5—6 of the type embodying fiber or wire bristles engaged by and extending radially from a twisted wire shaft 8 in a well known manner.

The shaft 8 of the brush 5 constitutes a drive shaft and has its ends fixed in sleeves 9—9' which extend through the end walls *c—d* and through bearings 10—10' and are affixed to the hubs 11—11' of a pair of traction wheels 12—12' affording a wheeled support for the bed A.

The twisted wire shaft 8 of the brush roller 6 are fixed to sleeves 14—14' which extend through elongated horizontally extending slots 15 in the end walls *c—d* and are supported in horizontally adjustable bearings 16 whereby the roller 6 may be advanced or retracted relative to the roller 5 and whereby the tips of the bristles of the brushes 5 and 6 may be overlapped to various extents and thus afford an intermeshing engagement between the bristles of the brushes 5 and 6 whereby on rotation of the brush 5, brush 6 will be caused to rotate therewith.

Each of the bearings 16—16' is here shown as fitted with a yoke 17 engaging a head 18 on an adjustment screw 19 threaded in a flange 20 on the end wall *c* or *d* the screws 19 being adjustable longitudinally in the flange 20 to advance or retract the bearings 16—16' and the brush 6 carried thereby.

As a means for supporting the shafts 8 intermediate their ends and prevent sagging thereof, a transverse strip 21 is provided to extend beneath and afford a support for the shafts; the strip being here shown as affixed at its ends to the bottom walls *e—e* and the shafts 8 being shown as fitted intermediate their ends with sleeves 22 arranged to bear on the upper edge of the strip 21.

A baffle plate 23 extends over the interengaged portions of the brushes 5 and 6 in spaced relation thereto and has its ends supported on the end walls *c* and *d* the plate 23 serving to protect the brushes from the weight of the entire mass of materials contained in the bed A; the baffle 23 serving to carry a portion of the load such as to prevent excessive derangement of the flexible bristles of the brushes under such load.

The bed A is fitted with a suitable handle C whereby it may be manually trundled over a surface.

The operation of the invention is apparent from the foregoing as being obvious that on placing a quantity of dry or substantially dry manure in the bed A and advancing the latter on the wheels 12—12' the brush 5 will be positively driven from the wheels and by reason of the inter-engagement of its bristles with those of the brush 6 will at least tend to rotate the latter; advance movement of the device rotating the brushes inwardly toward each other at their upper portions as indicated by the arrows in Fig. 3 whereby materials in the bed A will be engaged by the tips of the bristles and fed downwardly between the brushes to discharge through the slot *f*.

The materials on thus being engaged and forced between the rotating brushes will be finely divided, since lumps thereof will be broken and disintegrated by the action of the bristles thereon, the bristles being sufficiently close together and while being flexible are sufficiently stiff to effect such action.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a manure spreader, a hopper having a downwardly opening discharge slot, a pair of parallel cylindrical brushes revolubly mounted in said hopper above the discharge slot, said brushes being formed with flexible bristles and being arranged with the tips of the bristles of one of the brushes overlapping the tips of the bristles of the other brush in driving engagement therewith, traction wheels supporting said hopper, and means for driving one of said brushes from said traction wheels.

2. In a manure distributor embodying a hopper like bed having side and end walls and downwardly converging bottom walls leading to a discharge opening extending between the end walls; a pair of parallel feed rollers revolubly mounted within said bed and extending longitudinally thereof contiguous said discharge opening, said rollers each comprising a cylindrical brush having flexible bristles and being arranged with the tips of the bristles of one of the brushes overlapping the tips of the bristles of the adjacent brush in driving engagement therewith, each of said brushes embodying shafts revolubly supported on the end walls of said bed with the shaft of one of the brushes having its ends projecting through said end walls, and traction wheels directly affixed to said projecting ends affording a wheeled support for said bed and rotation of which will cause said brushes to rotate.

3. The structure called for in claim 2 together with a baffle in said bed carried on the end walls thereof and extending longitudinally in upwardly spaced relation to the interengaged positions of said brushes.

References Cited in the file of this patent

UNITED STATES PATENTS

| | | |
|---|---|---|
| 386,509 | King | Nov. 20, 1906 |
| 1,758,065 | Sherling et al. | May 13, 1930 |
| 2,523,642 | Becker | Sept. 26, 1950 |